United States Patent [19]

Carroll

[11] 3,977,334
[45] Aug. 31, 1976

[54] PIVOTABLY MOUNTED SHELF

[75] Inventor: Wilfred J. Carroll, Etobicoke, Canada

[73] Assignee: Carroll Wire Sales, Etobicoke, Canada

[22] Filed: June 5, 1975

[21] Appl. No.: 583,993

[52] U.S. Cl. .............................. 108/134; 211/150
[51] Int. Cl.² ............................................ A47F 5/01
[58] Field of Search ........... 211/149, 150, 153, 181, 211/134; 108/134, 59, 112

[56] References Cited
UNITED STATES PATENTS

| | | | |
|---|---|---|---|
| 2,319,470 | 5/1943 | Nobles | 211/153 |
| 2,680,522 | 6/1954 | Temple | 108/59 |
| 2,956,689 | 10/1960 | Van der Togt | 211/181 |
| 3,027,016 | 3/1962 | Becht | 211/153 |
| 3,101,148 | 8/1963 | Brown | 211/181 X |
| 3,497,073 | 2/1970 | Bartell | 108/59 X |
| 3,690,744 | 9/1972 | Squire | 211/153 X |
| 3,891,228 | 6/1975 | Rhinehart et al. | 211/149 X |

FOREIGN PATENTS OR APPLICATIONS

| | | | |
|---|---|---|---|
| 731,996 | 6/1955 | United Kingdom | 211/149 |

Primary Examiner—Roy D. Frazier
Assistant Examiner—Robert W. Gibson, Jr.
Attorney, Agent, or Firm—Alan Swabey & Co.

[57] ABSTRACT

The invention relates to a shelf which is pivotably mounted on a wire cart, and an arrangement for pivotably mounting the shelf. The wire cart has at least one horizontally extending rod for pivotably supporting the shelf, and the shelf includes a first side which is disposed adjacent to the rod, and a plurality of wires which extend in parallel with the first side and which are disposed in the interior of the shelf. The shelf further includes the pivoting arrangement consisting of at least one elongate wire perpendicular with the first side, and having a loop at one end encircling the rod, and a loop at the other end encircling one of the plurality of wires in the interior of the shelf. The loops make the elongate means pivotable relative to the rod and the one of the plurality of wires, so that shelf is movable upwards and backwards relative to the rod.

9 Claims, 6 Drawing Figures

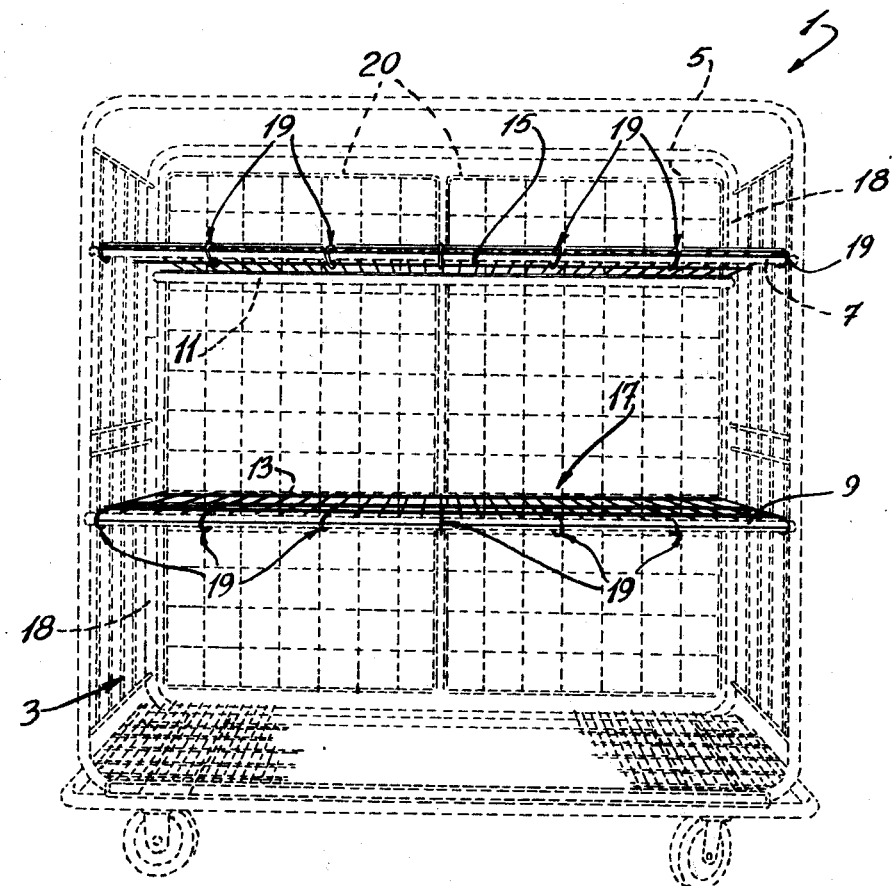
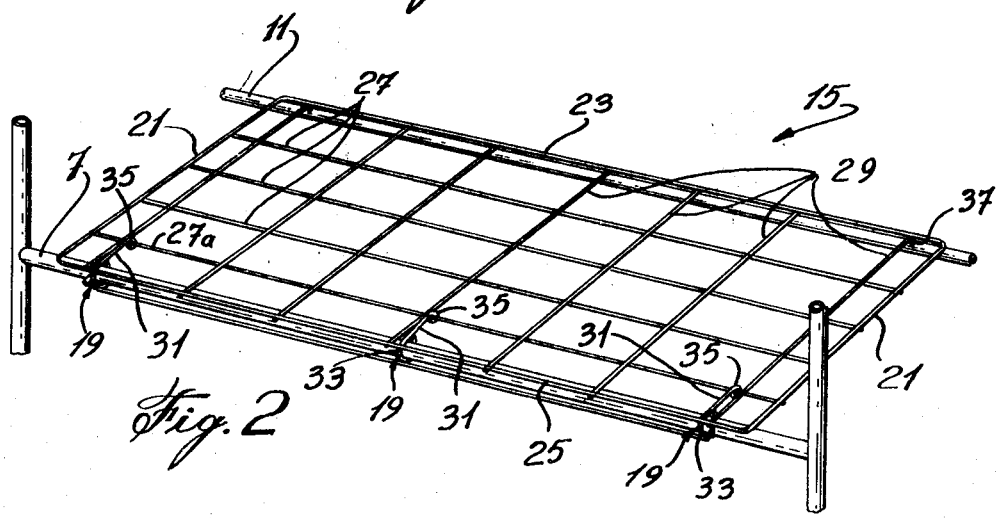
Fig. 1
Fig. 2

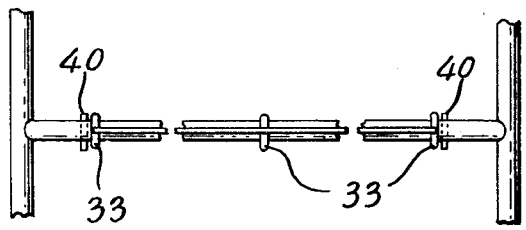
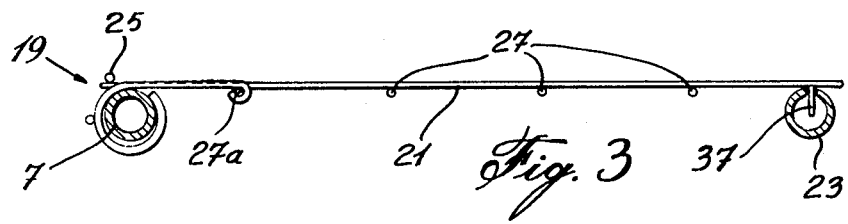
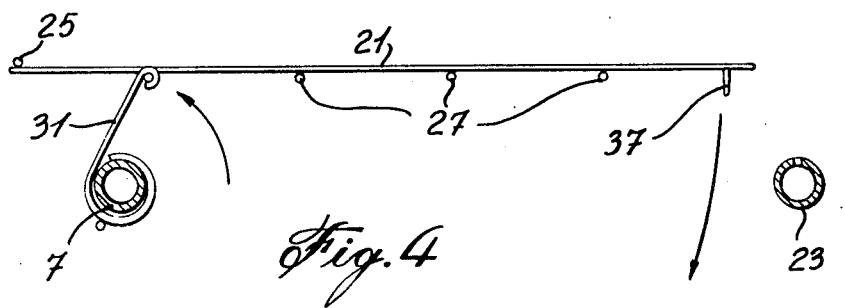
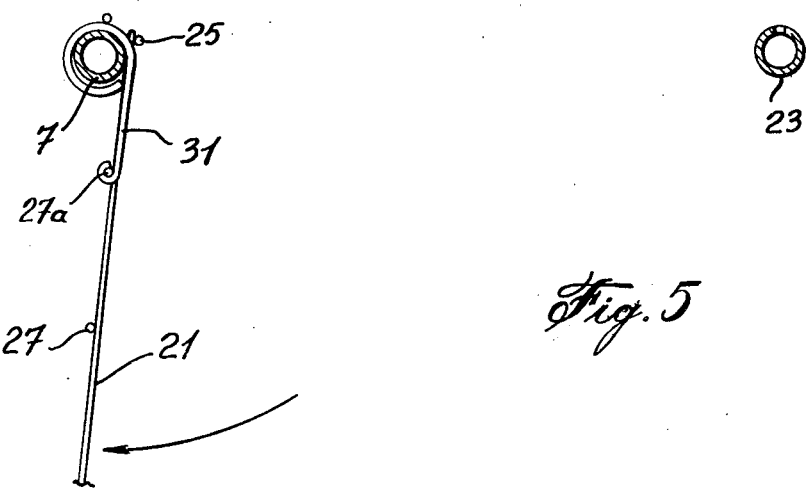

PIVOTABLY MOUNTED SHELF

BACKGROUND OF THE INVENTION

1. Field of the Invention

This invention relates to a pivoting arrangement for pivotably mounting a shelf on a wire cart, a shelf comprising such a pivoting arrangement, and a wire cart comprising such a shelf.

2. Description of the Prior Art

Wire carts having shelves which are pivotable from a horizontal to a vertical position, and back, are known in the art, e.g., the carts identified by the trade name CONVERTA. In such carts, the pivotable shelves are normally pivotably supported at rear edge thereof, on a rod extending horizontally across the rear side of the cart. When in the horizontal position, the shelves, at their front edges, are supported by a like horizontally extending rod extending across the front side of the cart and the front side of the cart is provided with vertical doors. The pivoting means at the rear of the shelves normally comprise circular loops which are attached at the extreme rear edge of the shelf and which encircle the rear side rod.

In order for the front edges of the shelves to clear the rod at the front of the cart when moving the shelf from the horizontal to the vertical position, it is necessary to be able to move the shelf backwards so that the front edge of the shelf moves behind the front rod. To enable this, the loops at the back of the shelf are made oversize relative to the diameter of the rear rod, so that some play is made available in the horizontal motion of the shelf. However, the oversized loops provide protrusions which are disadvantageous as they catch up in objects or people as they are being wheeled past them, or they will be the first parts hit when other moving objects make physical contact with the cart. In the latter case, if the physical contact involves substantial force, the loops may be damaged so that the cart will have to be repaired.

SUMMARY OF THE INVENTION

It is therefore an object of the invention to provide a pivoting arrangement for a shelf of a wire cart which will allow movement of the shelf in the horizontal direction which will not include such protrusions at the rear of the cart.

It is a further object of the invention to provide a shelf for a wire cart comprising such a pivoting arrangement.

It is a still further object of the invention to provide a wire cart comprising such a shelf.

In accordance with the invention a shelf for mounting on a wire cart, the cart comprising at least one horizontally extending rod for pivotably supporting the shelf comprises a first side disposed adjacent the rod; a plurality of wires extending in parallel with the first side and disposed in the interior of the shelf; and pivoting means comprising at least one elongate means extending substantially perpendicularly to the first side, one end of the elongate means being pivotably attached to the rod, the other end of the elongate means being pivotably attached to one of the plurality of wires disposed in the interior of the shelf.

The shelf may comprise a plurality of elongate means, each of the elongate means being pivotably attached to the rod at one end thereof, and being further pivotably attached to the one of the plurality of wires at the other end thereof.

Preferably, each of the elongate means comprises a loop at the one end thereof for encircling the rod whereby the elongate means are pivotably attached to the rod, and wherein each of the elongate means further comprises a loop at the other end thereof for encircling the one of the plurality of wires whereby the elongate means are pivotably attached to the one of the plurality of wires.

Each of the elongate means may comprise an elongate wire, and the loops may comprise wire loops integral with the elongate wire.

In another aspect, the invention relates to wire cart comprising a shelf pivotably mounted thereon, and further comprising at least one horizontally extending rod for pivotably supporting the shelf, the shelf comprising; a first side disposed adjacent the rod; a plurality of wires extending in parallel with the first side and disposed in the interior of the shelf; and pivoting means comprising at least one elongate means extending substantially perpendicularly to the first side, one end of the elongate means being pivotably attached to the rod, the other end of the elongate means being pivotably attached to one of the plurality of wires disposed in the interior of said shelf.

BRIEF DESCRIPTION OF THE DRAWINGS

The invention will be better understood by an examination of the following description together with the accompanying drawings in which:

FIG. 1 is a perspective view of the cart on which the shelf with the inventive pivoting arrangement may be mounted;

FIG. 2 is a perspective view of the shelf;

FIG. 2a is a rear view of the shelf;

FIG. 3 is a side view of the shelf in the horizontal rest position;

FIG. 4 is a side view of the shelf in the horizontal lifted position; and

FIG. 5 is a side view of the shelf in the vertical position.

DETAILED DESCRIPTION OF THE DRAWINGS

Referring to FIG. 1, a wire cart on which the invention can be used is illustrated generally at 1 and comprises a front side 3 and a rear side 5. Extending horizontally across the front of the cart are rods 7 and 9, and extending horizontally across the rear of the cart are rods 11 and 13. As will be appreciated, more or less than two rods could extend at the front and rear of the cart.

The cart includes a top shelf 115 and a bottom shelf 17 both shown in their horizontal positions. The shelves are supported by pivoting means 19 on the rods 7 and 9 whereby they can be pivoted into a vertical position to form a front wall for the cart. The cart includes vertical doors 20 at the rear side of the cart, the vertical doors being pivoted on the vertical rods 18 joining the rods 15 and 17. The doors are usually held closed when the shelves are in the horizontal position to form a wall on the side of the cart, and are used as doors when the shelves are in the vertical position.

A shelf with pivoting means in accordance with the invention is shown in greater detail in FIG. 2. As can be seen in FIG. 2, the shelf comprises end peripheral wires 21 and a rear side peripheral wire 23 and a front side peripheral wire 25. It also includes a plurality of interior wires 27, disposed in parallel arrangement with the front side peripheral wire 25, and a further plurality of interior wires disposed at right angles to the first plurality of interior wires.

The novel pivoting means is illustrated generally at 19 and includes an elongate means, such as a wire 31, having a pivotable attachment means such as a loop 35 at one end thereof. The elongate means is pivotably attached to rod 7 by encircling rod 7 of the wire cart with the loop 35 when the shelf is mounted on the cart. The other end of 31 comprises a second loop 33 and the second end of the elongate means 31 is pivotally attached to one of the plurality of wires 27a on the interior of the shelf by encircling the wire 27a. It is critical, in accordance with the invention, that the second loop be attached to an interior wire, but the specific interior wire is a function of the shelf size and designers preference. Thus, although in FIG. 2 the loop is connected to the first interior wire, it could also be connected to the second or third etc. of such interior wires.

Because of the pivotable connections at both ends of the wire 31, the shelf is pivotable relative to both the rod 7 and the elongate means 31, i.e., the shelf can move both vertically and horizontally relative to the rod 7.

Tapered pins or clamps may be provided for the two end loops to keep the shelf centered. These tapered pins or clamps are shown in FIGS. 2 and 2a at 40. As can be seen, the tapered pins will prevent the loops from moving along the rod 7.

The operation of the novel pivoting arrangement will be explained with reference to FIGS. 3, 4 and 5. In FIG. 3, the shelf is horizontally disposed, and is supported at the rear side thereof by hook means 37 which is part of the shelf and which could fit into respective opening, provided therefore, in rear rod 11, or which could hook over the back end of the rear rod 11. Of course, the shelf could lie flat on the rod 11 so that hook means would not be required. In any case, the rod 11 will prevent the shelf from moving vertically downwards.

To enable the shelf to be moved vertically downward, it is first lifted up and then back as shown in FIG. 4. With this movement, the front edge of 37 is behind the rod 11 so that the shelf can be pivoted downward. The shelf is then dropped or guided to the vertical position as shown in FIG. 5.

Although only a single embodiment has been described above, this was for the purpose of illustrating, but not limiting, the invention. Various modifications, which will come readily to the mind of one skilled in the art, are within the scope of the invention as defined in the appended claims.

I claim:

1. A shelf for pivotable mounting on a wire cart, said cart comprising at least one horizontally extending rod for pivotably supporting said shelf, said shelf comprising;

a surrounding frame member having a first edge disposed adjacent said rod;

a plurality of wires extending in parallel with said first edge and disposed in the interior of said frame member;

and pivoting means comprising at least one elongate means extending substantially perpendicularly to said first edge, one end of said elongate means being pivotably attached to said rod, the other end of said elongate means being pivotably attached to one of said plurality of wires disposed in the interior of said frame member.

2. A shelf as defined in claim 1 and comprising a plurality of elongate means, each of said elongate means being pivotably attached to said rod at one end thereof, and being further pivotably attached to said one of said plurality of wires at the other end thereof.

3. A shelf as defined in claim 2 wherein each of said elongate means comprises a loop at the one end thereof for encircling said rod whereby said elongate means is pivotably attached to said rod; and wherein each of said elongate means further comprises a loop at the other end thereof for encircling said one of said plurality of wires whereby said elongate means is pivotably attached to said one of said plurality of wires.

4. A shelf as defined in claim 3 wherein each of said elongate means comprises an elongate wire, and wherein said loops comprise wire loops integral with said elongate wire.

5. A shelf as defined in claim 4 and further comprising;

a second plurality of wires disposed at right angles to said first plurality of wires in the interior of said shelf;

first and second end peripheral wires disposed in parallel with said second plurality of wires;

a first peripheral edge wire disposed at said one edge; and a second peripheral edge wire disposed on the side of said shelf opposite said first edge.

6. A wire cart comprising a shelf pivotably mounted thereon, and further comprising at least one horizontally extending rod for pivotably supporting said shelf, said shelf comprising;

a first edge disposed adjacent said rod;

a plurality of wires extending in parallel with said first edge and disposed in the interior of said shelf;

and pivoting means comprising at least one elongate means extending substantially perpendicularly to said first edge, one end of said elongate means being pivotably attached to said rod, the other end of said elongate means being pivotably attached to one of said plurality of wires disposed in the interior of said shelf.

7. A cart as defined in claim 6 and comprising a plurality of elongate means, each of said elongate means being pivotably attached to said rod at one end thereof, and being further pivotably attached to said one of said plurality of wires at the other end thereof.

8. A cart as defined in claim 7 wherein each of said elongate means comprises a loop at the one end thereof for encircling said rod whereby said elongate means is pivotably attached to said rod, and wherein each of said elongate means further comprises a loop at the other end thereof for encircling said one of said plurality of wires whereby said elongate means is pivotably attached to said one of said plurality of wires.

9. A cart as defined in claim 8 wherein each of said elongate means comprises an elongate wire, and wherein said loops comprise wire loops integral with said elongate wire.

* * * * *